(12) United States Patent
Melara

(10) Patent No.: US 7,207,084 B2
(45) Date of Patent: Apr. 24, 2007

(54) SELF-ORIENTING CASTER FOR MOVING PIECES OF FURNITURE AND THE LIKE

(75) Inventor: Francescantonio Melara, Bologna (IT)

(73) Assignee: Emilsider Meccanica S.p.A., Cadriano di Granarolo Emilla (IT)

( * ) Notice: Subject to any disclaimer, the term of this patent is extended or adjusted under 35 U.S.C. 154(b) by 0 days.

(21) Appl. No.: 10/971,155

(22) Filed: Oct. 25, 2004

(65) Prior Publication Data

US 2005/0086765 A1 Apr. 28, 2005

(30) Foreign Application Priority Data

Oct. 28, 2003 (IT) .......................... BO20030112 U

(51) Int. Cl.
*B60B 33/00* (2006.01)
(52) U.S. Cl. ........................ 16/22; 16/30; 16/37; 16/38
(58) Field of Classification Search .................... 16/30, 16/37, 38, 39, 43, 22
See application file for complete search history.

(56) References Cited

U.S. PATENT DOCUMENTS

| | | | | |
|---|---|---|---|---|
| 2,181,722 A | | 11/1939 | Butter et al. | |
| 3,997,938 A | * | 12/1976 | Pinaire et al. | ................. 16/45 |
| 4,120,071 A | * | 10/1978 | Crescenzi | ....................... 16/37 |
| 4,720,894 A | * | 1/1988 | Deasy et al. | .................... 16/37 |
| 4,793,021 A | * | 12/1988 | Deasy et al. | .................... 16/37 |
| 5,263,238 A | * | 11/1993 | Cooper | ........................ 29/444 |

FOREIGN PATENT DOCUMENTS

FR 636 020 A 3/1928

* cited by examiner

*Primary Examiner*—Brian E. Glessner
*Assistant Examiner*—Mark Williams
(74) *Attorney, Agent, or Firm*—Modiano & Associati; Albert Josif; Daniel J. O'Byrne

(57) ABSTRACT

A self-orienting caster, constituted by at least one wheel, which can rotate on a shaft driven horizontally through the seat of a support provided with a vertical recess open upward and offset axially with respect to the shaft and in which a caster pivoting pivot rotates that is provided with first and second portions insertable in a seat of a furniture piece, the second portion having an end stem with reduced diameter forming a shoulder, a bush fixed axially on the stem and forming an annular groove for accommodating, without play, an elastic ring that presses by expanding against the wall of the recess.

5 Claims, 4 Drawing Sheets

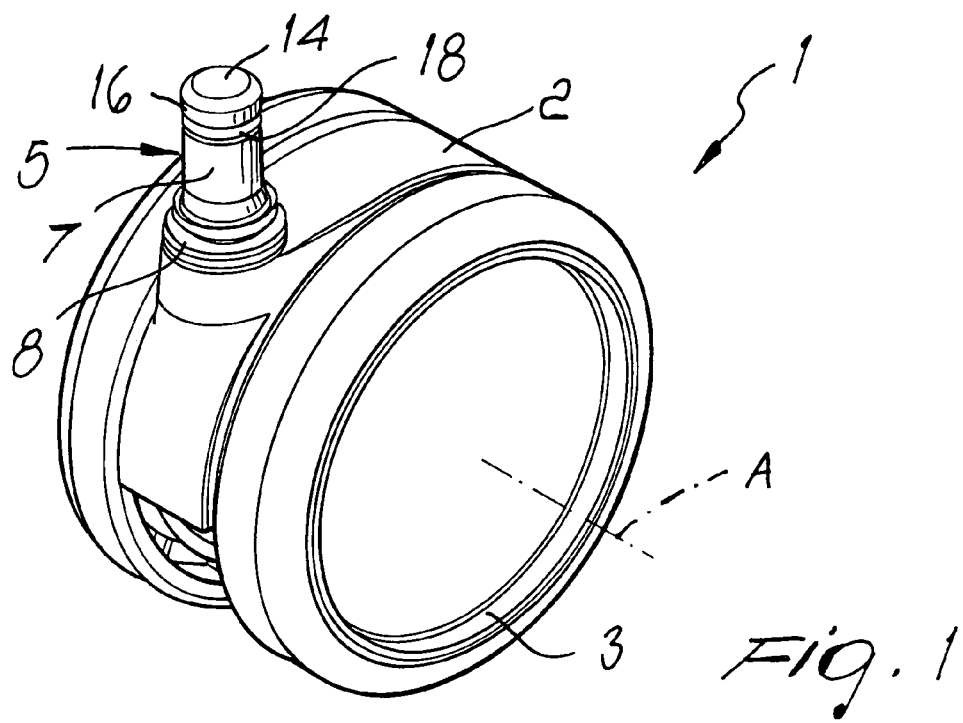
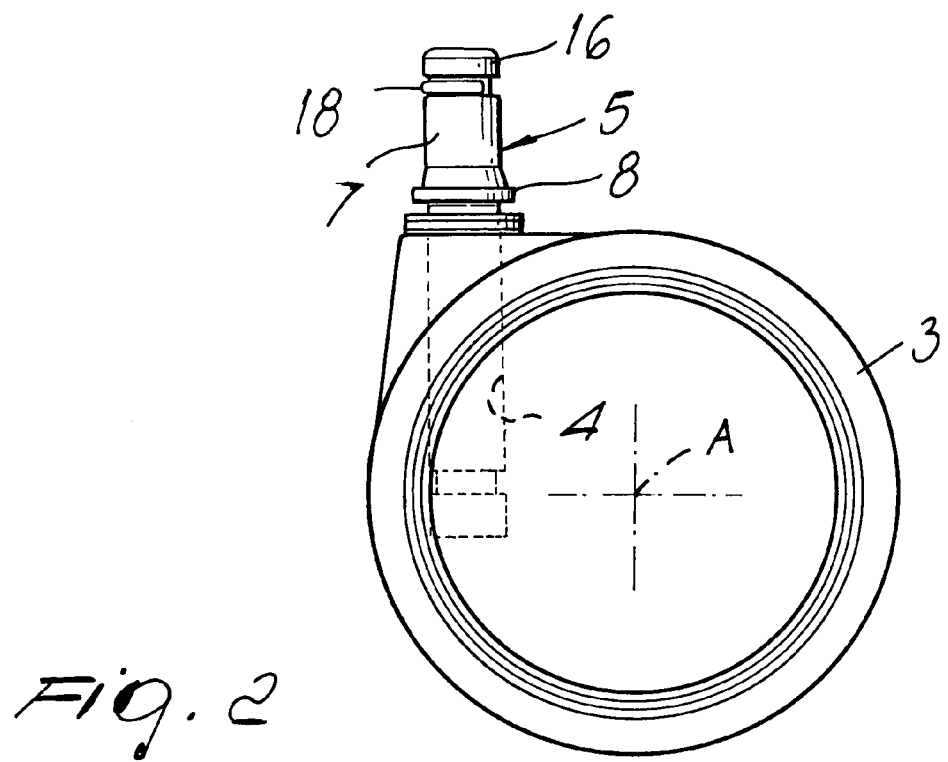

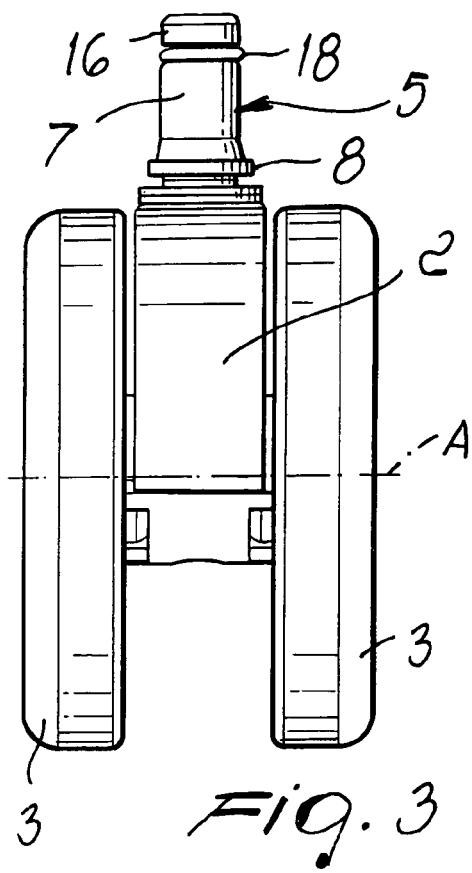
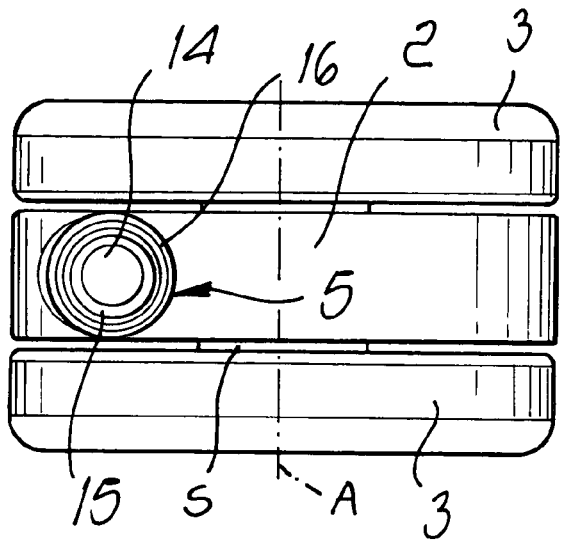
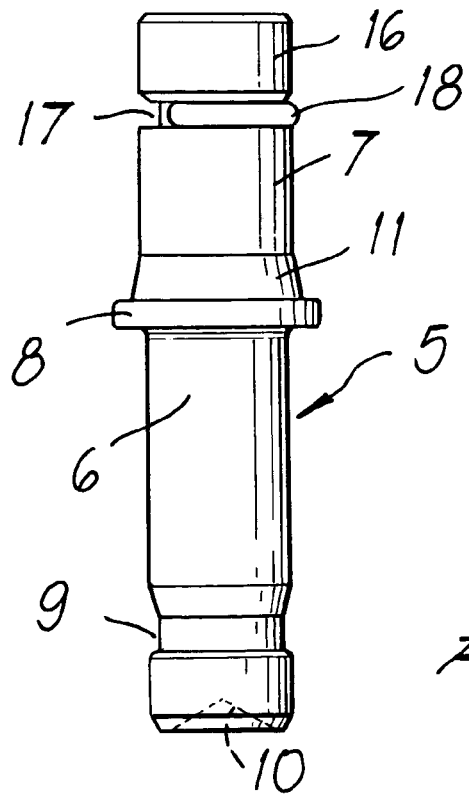

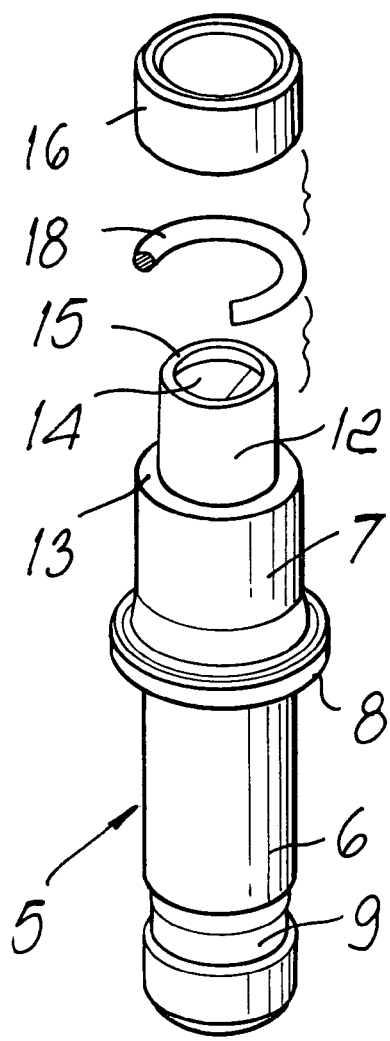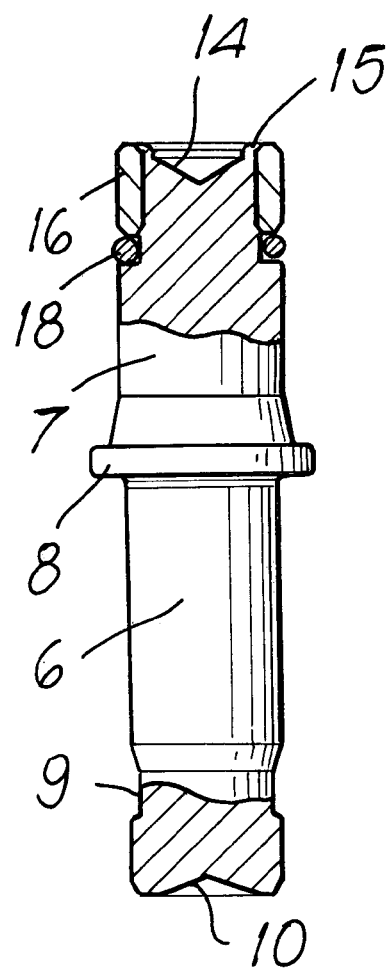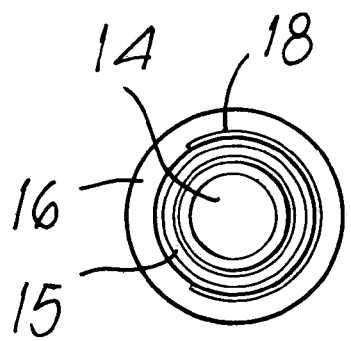

SELF-ORIENTING CASTER FOR MOVING PIECES OF FURNITURE AND THE LIKE

The present invention relates to a self-orienting caster for moving pieces of furniture and the like.

BACKGROUND OF THE INVENTION

Self-orienting casters, particularly of the so-called twin type, constituted by two wheels mounted so that they can rotate about a shaft, are known. The shaft is supported in a seat that is formed in a supporting structure that lies between the wheels and often comprises a sort of semi-cylindrical housing that covers the wheels in an upper region.

A vertical cylindrical recess is formed in the supporting structure, is open upward and axially offset with respect to the shaft, and acts as a rotation seat for a vertical pivot for the self-orientation (pivoting) of the caster, which is designed to be inserted and retained in a seat of the piece of furniture on which the wheel is to be fitted.

Self-orienting casters of the described type have the drawback that the pivot for self-orientation of the caster can often cause excessive and unpleasant noise, particularly when the caster runs over a rough surface or if the seat of the piece of furniture intended to receive the pivot is formed inside a metallic body. This is observed especially in chairs or armchairs that are provided with a metallic pedestal with radial arms, in which the casters are fitted at the ends of the arms. This drawback, which is present even with new casters, due to the inevitable plays of the pivots in respective recesses of the pedestal, is increased when the plays, due to use, tend inevitably to increase.

SUMMARY OF THE INVENTION

The aim of the present invention is to obviate the above-mentioned drawbacks of known self-orienting casters by providing a simple and effective solution that does not entail substantial changes to the structure of currently commercially available casters and is therefore economically advantageous.

This aim is achieved with a self-orienting caster, constituted by at least one wheel, which can rotate on a shaft that is driven horizontally through the seat of a support that is provided with a vertical cylindrical recess, which is open upward and offset axially with respect to the shaft and in which a caster pivoting pivot can rotate with a first portion and is provided with a second portion that can be inserted in a seat of the piece of furniture on which the caster is to be fitted, characterized in that said second portion has an end stem that has a reduced diameter so as to form a shoulder, a bush being fixed axially on said stem and forming, together with said shoulder, an annular groove for accommodating, without axial play, an elastic ring that is suitable to press by expanding against the wall of said recess.

BRIEF DESCRIPTION OF THE DRAWINGS

Further characteristics and advantages of the present invention will become better apparent from the following detailed description of a preferred but not exclusive embodiment of a caster, illustrated by way of non-limiting example in the accompanying drawings, wherein:

FIG. 1 is a perspective view of a self-orienting twin caster provided with the innovation according to the invention;

FIG. 2 is a side elevation view of the caster of FIG. 1;

FIG. 3 is a front elevation view of the caster of FIG. 1;

FIG. 4 is a plan view of the caster of FIG. 1;

FIG. 5 is a view of the pivot for the pivoting of the caster;

FIG. 6 is an exploded view of the pivot of FIG. 5;

FIG. 7 is a sectional view of the pivot of FIG. 5;

FIG. 8 is an axial view of the pivot of FIG. 5;

DESCRIPTION OF THE PREFERRED EMBODIMENTS

Figure 10:
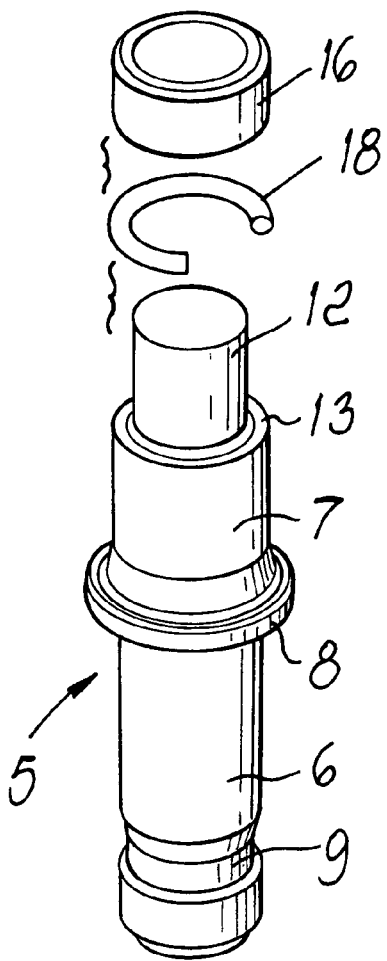
FIG. 10 is an exploded view of the pivot of FIG. 9.

With reference to FIGS. 1 to 8, the reference numeral 1 generally designates a generic twin caster of the self-orienting type, which is composed of a supporting structure 2 for two wheels 3 mounted so that they can rotate on a common shaft S that has a horizontal axis A and is driven through a seat of the structure 2.

The structure 2 is made of plastics or metallic material and has a recess 4, which has a vertical axis, lies between the wheels 3, and accommodates a pivot 5, by means of which the caster is pivotably fitted to a piece of furniture, for example a chair provided with a pedestal with radial arms, at the ends of which seats for fitting the casters are provided.

As shown more clearly in FIGS. 5 to 8, the pivot 5 for the pivoting of the caster is structurally cylindrical and comprises a lower portion 6 and an upper portion 7, which are mutually separated by an annular flange 8. An annular groove 9 is provided in the lower portion 6, and a conical cavity 10 is provided in the end of the portion 6.

The portion 6 is inserted in the recess 4, where in order to retain the pivot 5 axially there is an internal collar, which engages the slot 9 by forcing. A steel ball (not shown) is conveniently arranged in the bottom of the recess 4, and by engaging in the concavity 10 acts as a supporting point for the load that bears on the caster.

The upper portion 7 of the pivot 5 comprises, proximate to the annular flange 8, a conical connecting region 11, which is flared toward said flange, and a region having a reduced diameter, which forms an end stem 12. The end stem 12 is separated from the remaining part of the portion 7 by a shoulder 13. Further, a dead end hole 14 is formed axially in the free end of the stem 12 and is surrounded by an annular lip 15.

A bush 16 made of plastic material is applied to the stem 12, and its length is such as to produce, together with the shoulder 13, once it is arranged on the stem 12, an annular groove 17. An open and elastic (i.e., elastically expanding) metallic ring 18 is arranged in the groove 17, has a circular cross-section, and has, in the expanded condition, an outside diameter that is slightly larger than the diameter of the portion 7 and an inside diameter that is at least equal to the diameter of the stem 12.

The ring 18 is locked in the groove 17 by the bush 16, which in turn is retained on the stem 12 by an annular ridge obtained by folding outward the lip 15. The bush 16 is applied to the stem 12 with slight interference, and its position is set so that the ring 18 has no axial play in the groove but at the same time is capable of closing radially on the pivot when said pivot is inserted in its seat of the piece of furniture (chair).

Advantageously, the locking of the bush 16 on the stem 12 is assisted by the retaining action performed by the lip 15, so as to ensure, even with extended use and in more unfavorable operating conditions, the noise-reducing effectiveness of the caster.

It should be noted that the noise-reducing action of the ring 18 occurs both radially and axially. Once the pivot 5 has been inserted in its seat in the piece of furniture (chair), the ring 18, by way of its larger radial dimensions, presses against the wall of said seat, so as to contrast the transverse vibrations that are transmitted from the pivot to the pedestal by means of the caster. At the same time, and this is a fundamental prerogative of the present innovative concept, the bush 16, by way of the locking effect performed axially on the ring 18 (which is locked by the lip 15 against the shoulder 13), prevents any axial movement thereof and consequently prevents the onset of vibration.

In its practical embodiment, the invention is susceptible of numerous modifications and variations, all of which are within the scope of the same inventive concept. Thus, for example, the elastic ring 18 may have a square, rectangular or elliptical cross-section. Advantageously, the elastic ring 18 has opposite ends (which form its gap) that are mutually axially offset, so that once the ring has been inserted in the groove 17 one of its ends presses against the bush 12 and the other end presses against the shoulder 13.

Figure 9:
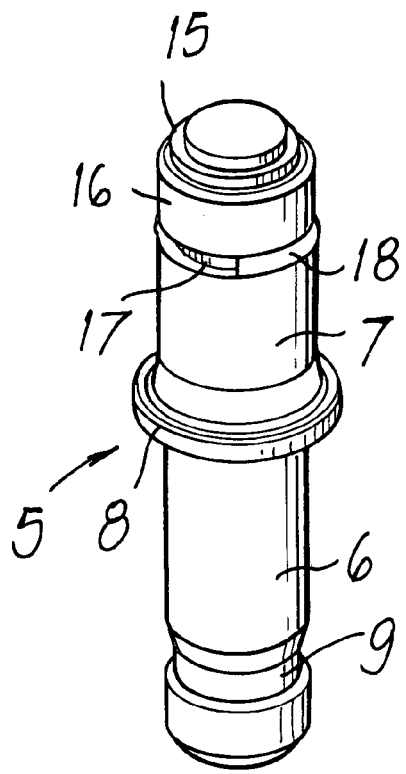
FIG. 9 is a perspective view of a pivot according to another embodiment.
Figure 11:
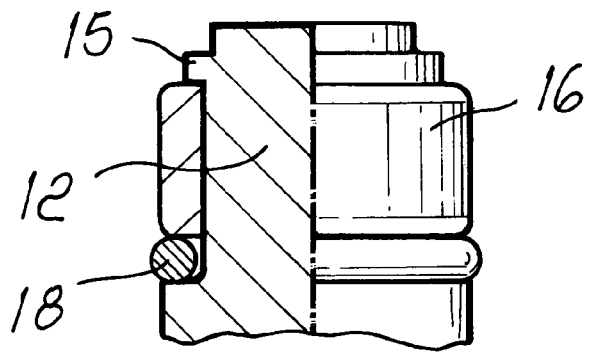
FIG. 11 is a sectional view of the end of the pivot.

FIGS. 9 to 11 illustrate an embodiment of the caster in which the stem 12 is not provided with a dead end hole 14 and the lip 15 for retaining the bush 16 is obtained by heading the outer edge of the stem 12 so as to form a collar that protrudes outward from the stem 12 and, by acting axially on the bush 16, keeps the ring 18 compressed.

The disclosures in Italian Utility Model Patent Application No. BO2003U000112 from which this application claims priority are incorporated herein by reference.

What is claimed is:

1. A self-orienting caster, comprising; a support, provided with a vertical cylindrical recess open upward; a shaft that is driven horizontally through a seat of said support; at least one wheel, which is rotatably mounted on said shaft; a pivot inserted in said recess that is offset axially with respect to said shaft, for allowing pivoting of the caster, said pivot having a first portion tat is inserted in said recess and a second portion that is insertable in a seat of a piece of furniture on which the caster is to be fitted and an elastic ring, said second portion comprising an end stem that has a reduced diameter so as to farm a shoulder; a bush that is arranged about said stem and that is fixed axially on said stem and forms, together with said shoulder, an annular groove for accommodating, without axial play, said elastic ring that is adapted to press by expanding against an inner wall of the seat in which the caster is to be fitted, said stem being provided with a heading that forms an annular lip, said bush being fixed axially on said stem by way of said annular lip.

2. The self-orienting caster of claim 1, wherein said bush is made of plastic material.

3. The self-orienting caster of claim 1, wherein said elastic ring has a cross-sectional shape, selected from among circular, quadrangular and elliptical shapes.

4. The self-orienting caster of claim 3, wherein said annular lip is formed by a dead end hole, which is provided axially at a free end of said stem, said lip being provided folded by an outward heading.

5. The self-orienting caster of claim 3, wherein said annular lip is provided by axial heading of an outer edge of a free end of said stem so as to form an abutment collar for said bush.

\* \* \* \* \*